April 7, 1936.　　　C. G. MALECEK　　　2,036,946
ARTIFICIAL BAIT
Filed May 1, 1934

INVENTOR
CHARLES G. MALECEK
BY　Ely & Barrow
ATTORNEYS

Patented Apr. 7, 1936

2,036,946

UNITED STATES PATENT OFFICE 2,036,946

ARTIFICIAL BAIT

Charles G. Malecek, Cleveland, Ohio, assignor to The Enterprise Manufacturing Company, Akron, Ohio, a corporation of Ohio Application May 1, 1934, Serial No. 723,335

7 Claims. (Cl. 43—46)

The present invention relates to the manufacture of artificial baits, particularly those of the plug or artificial minnow form, being provided with peculiar and distinctive body formation which gives the bait a characteristic movement in the water, as it is trolled.

Baits of this general type are old and well-known, but the present form of minnow or plug is different in its specific formation, which causes it to react differently from previous baits. This result is due to the form of the bait and its peculiar forward end, which reacting against the water in a peculiar and distinctive fashion sets up a diving, wobbling, wiggling action in the water that seems to be especially attractive to fish. It will be understood that exact conformity with the specific design is not essential and that changes and modifications may be made.

The body is indicated at 1 carrying the usual gang hooks 2 and 3 from the tail and underside thereof. In the forward end of the bait is located the usual screw eye 5 to which the line 6 is attached. This screw eye is located slightly above the median plane of the bait but in the vertical plane of the axis.

Figure 1:
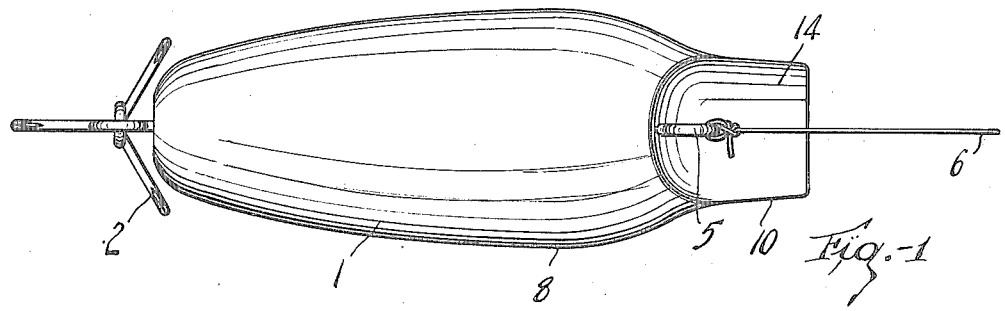
Figure 1 is a top view of the bait.
Figure 2:
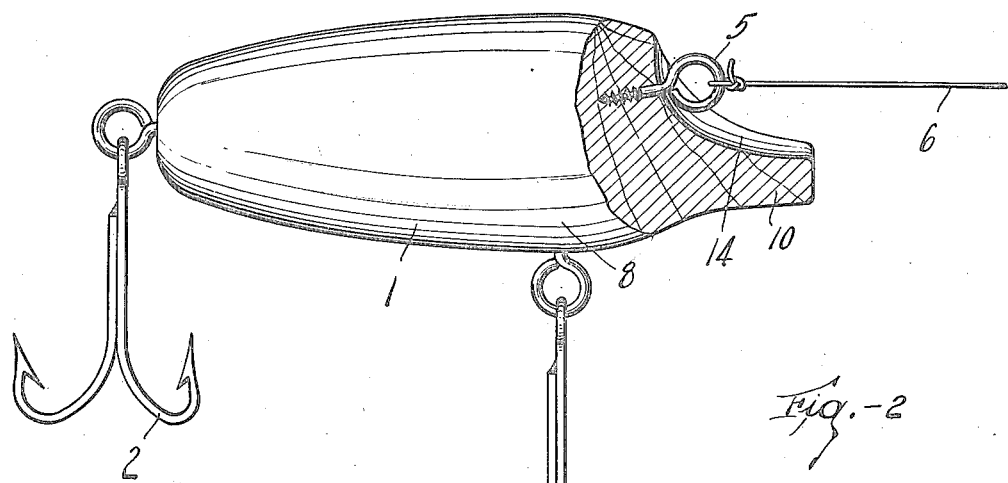
Figure 2 is a side view, the front of the bait being sectional to show the formation of the "snout"
Figure 3:
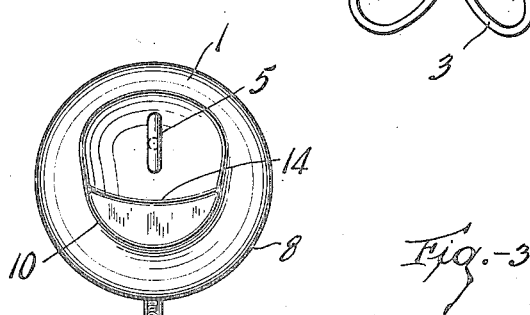
Figure 3 is an end view looking at the front of the bait.

The body is relatively long and circular in cross-section throughout a greater portion thereof and has its greatest diameter slightly forward of its central point. Forwardly of said region of greatest diameter the body is longitudinally reversely curved inwardly to provide a shoulder 8, and merges therebeyond with a scoop shaped snout or nose portion 10, the front end of which is flattened as shown to provide a flat surface against which the water will impinge. The under side of the snout 10 is convex and at the free end thereof is concentric with the axis of the body and of substantially smaller radius than the largest radius of the body, said under side being convex in a plane substantially perpendicular to the flat end face of the snout, and the sides of the snout being substantially parallel in plan view, as shown in Figure 1.

The upper side of the snout is hollowed out upon both a transverse and longitudinal curvature, giving a trough-shaped recess over the face of the bait in which the point of attachment 5 is located. The base of this recess recedes from the axis at a non-uniform curvature, preferably in the nature of a parabola, starting at approximately 10° to 15° from the axis and approaching 90° at its rearward and upward ending point. It will also be noted that the end of the snout is below the central axis of the bait, and is lune shaped in profile.

It is somewhat difficult to explain the causes of the peculiar and distinctive movement of the bait in the water, or the manner in which the water reacts against the various surfaces and planes of the bait, but the mass of water striking against the forward end of the snout and against the curved surface 14, in combination with the pull upon the line, seems to be the reason. In any event these features and possibly the shoulder 8 in conjunction give to the bait a very effective and attractive movement which seems to lure the fish more effectively than baits of earlier design and configuration. The position of the hooks also has an effect upon the action of the bait, as they act as ballast and therefore control in some measure the motions which are imparted to the bait by the water.

What is claimed is:

1. A bait of the type described comprising a body relatively long and circular in cross section throughout a greater portion thereof and having its greatest diameter forwardly of its middle, and having a forwardly extending snout portion having a transverse surface on its forward end and a trough-like recess in its upper surface, the lower surface of the snout being substantially perpendicular to said transverse surface, and being concentric with the axis of the body on a smaller radius than the largest radius of said body.

2. A bait of the type described comprising a body relatively long and circular in cross section throughout a greater portion thereof and having its greatest diameter forwardly of its middle, and formed with a forwardly extending snout portion having a transverse surface on its terminal end, the lower surface of the snout being substantially perpendicular to said transverse surface, and being concentric with the axis of the body on a smaller radius than the largest radius of said body, the upper surface of said snout being formed with a trough-like recess that is arcuate both in transverse and longitudinal planes.

3. A bait of the type described comprising a body relatively long and circular in cross section throughout a greater portion thereof and having its greatest diameter forwardly of its middle, and formed with a forwardly extending snout portion having a flat transverse surface on its forward end, the lower surface of the snout being substantially at right angles to said flat surface, and being concentric with the axis of the body on a smaller radius than the largest radius of the body, the upper surface of said snout being formed with a trough-like recess that is arcuate both longitudinally and transversely, the longitudinal curvature being in the form of a parabola that intersects the flat, forward end of the snout entirely below the axis of the snout.

4. A bait of the character described comprising a body relatively long and circular in cross section throughout a greater portion thereof and having its greatest diameter forwardly of its middle, and having on its forward end a snout portion that has a flat terminal surface that is lune shaped in profile, the convex surface of said snout being of smaller radius than the greatest radius of the body.

5. A bait of the character described comprising a body relatively long and circular in cross section throughout a greater portion thereof and having its greatest diameter forwardly of its middle, and having on its forward end a snout portion that has a flat terminal surface that is lune shaped in profile, the convex surface of said snout being of smaller radius than the greatest radius of the body, and merging with the body portion of greatest radius in a manner to provide a shoulder at the juncture thereof.

6. A bait of the character described comprising a body relatively long and circular in cross section throughout a greater portion thereof and having its greatest radius forwardly of its middle, and having its forward end formed with a snout that has a transverse surface on its forward end, which surface is disposed entirely below the axis of the body and is lune shaped in profile, the convex surface of said snout being substantially perpendicular to said transverse surface and being of smaller radius than the greatest radius of the body.

7. A bait body as defined in claim 6 in which there is a curved shoulder formed at the juncture of the rear end of the snout with the region of greatest diameter of the body.

CHARLES G. MALECEK.